United States Patent
Puhalla et al.

(10) Patent No.: US 8,060,306 B2
(45) Date of Patent: Nov. 15, 2011

(54) METHOD AND SYSTEM FOR OBSTACLE AVOIDANCE FOR A VEHICLE

(75) Inventors: Jeffrey Scott Puhalla, Hawley, MN (US); Daniel Wayne Mairet, Bettendorf, IA (US)

(73) Assignee: Deere & Company, Moline, IL (US)

( * ) Notice: Subject to any disclaimer, the term of this patent is extended or adjusted under 35 U.S.C. 154(b) by 1076 days.

(21) Appl. No.: 11/867,152

(22) Filed: Oct. 4, 2007

(65) Prior Publication Data

US 2009/0093960 A1    Apr. 9, 2009

(51) Int. Cl.
 *G06F 17/10* (2006.01)
 *B60T 8/32* (2006.01)
 *G01C 21/30* (2006.01)

(52) U.S. Cl. .......................... 701/301; 701/93; 701/209

(58) Field of Classification Search .................. None
See application file for complete search history.

(56) References Cited

U.S. PATENT DOCUMENTS

| | | | |
|---|---|---|---|
| 4,540,032 A * | 9/1985 | Pelletier et al. ............. 144/4.1 |
| 6,223,124 B1 * | 4/2001 | Matsuno et al. ............. 701/209 |
| 6,385,528 B1 * | 5/2002 | Takahashi ........................ 701/93 |
| 6,392,535 B1 * | 5/2002 | Matsuno et al. ............. 340/441 |
| 2005/0267683 A1 | 12/2005 | Fujiwara et al. | |
| 2006/0277882 A1 * | 12/2006 | Berger et al. ............. 56/10.2 J |

FOREIGN PATENT DOCUMENTS

| | | |
|---|---|---|
| WO | 90/02985 | 3/1990 |
| WO | 02/08010 | 1/2002 |
| WO | 2007/031578 | 3/2007 |

OTHER PUBLICATIONS

Fox, Dieter et al. The Dynamic Window Approach to Collision Avoidance. IEEE Robotics & Automation Magazine, 4 (1), Mar. 1997.

Fox, Dieter et al. Controlling Synchro-drive Robots with the Dynamic Window Approach to Collision Avoidance. Proceedings of the 1996 IEEE/RSJ Conference on Intelligent Robots and Systems.

* cited by examiner

*Primary Examiner* — Khoi Tran
*Assistant Examiner* — Ian Jen

(57) ABSTRACT

A mapping module or path filtering module is arranged to identify admissible curved paths for which the vehicle is able to stop prior to reaching a detected obstacle in accordance with an observed translational velocity and an observed rotational velocity. A data processor determines a respective objective function for the candidate translational velocities and candidate rotational velocities associated with the admissible curved paths, where the objective function includes a curvature comparison term associated with the last curved path of the vehicle. A search engine or data processor selects preferential velocities, among the candidate translational velocities and candidate rotational velocities, with a superior value for its corresponding objective function. A path planning module or data processor determines the vehicular speed and trajectory for a path plan that avoids the obstacle consistent with the selected preferential velocities.

18 Claims, 3 Drawing Sheets

METHOD AND SYSTEM FOR OBSTACLE AVOIDANCE FOR A VEHICLE

FIELD OF THE INVENTION

This invention relates to a method and system for obstacle avoidance for a vehicle or robot.

BACKGROUND OF THE INVENTION

Obstacle avoidance systems may be used to augment the performance of human operators of vehicles or for autonomous or unmanned vehicles. A reactive obstacle avoidance system may use local data of a vehicular environment to generate a control output for steering a vehicle to avoid an obstacle. However, a reactive obstacle detection system may be prone to delayed reaction or indecisiveness when computations approach boundaries, discontinuities, local maxima, or local minima. If a vehicle is presented with an obstacle directly in its path of travel, and the obstacle detection algorithm struggles with the computations associated with boundaries, discontinuities, local maxima, or local minima, the likelihood of a collision may increase markedly. Thus, there is need to expedite the search or solution for a suitable obstacle avoidance path to avoid a potential collision with the obstacle.

SUMMARY OF THE INVENTION

In accordance with one embodiment, a method and system for avoiding an obstacle comprises a sensor for collecting sensor data on a relative position of an obstacle with respect to a vehicle. A velocity module detects an observed translational velocity and an observed rotational velocity of a vehicle. A mapping module, path filtering module or data processor determines possible curved paths for the vehicle associated with candidate translational velocities and candidate rotational velocities. The mapping module or path filtering module is arranged to identify admissible curved paths for which the vehicle is able to stop prior to reaching the obstacle in accordance with the observed translational velocity and the observed rotational velocity. A data processor determines a respective objective function for the candidate translational velocities and candidate rotational velocities associated with the admissible curved paths, where the objective function includes a curve comparison term (e.g., weighted curve comparison term) associated with the last curved path of the vehicle. A search engine or data processor selects preferential velocities, among the candidate translational velocities and candidate rotational velocities, with a superior value for its corresponding objective function. A path planning module or data processor determines the vehicular speed and trajectory for a path plan that avoids the obstacle consistent with the selected preferential velocities.

DESCRIPTION OF THE PREFERRED EMBODIMENT

Figure 1:
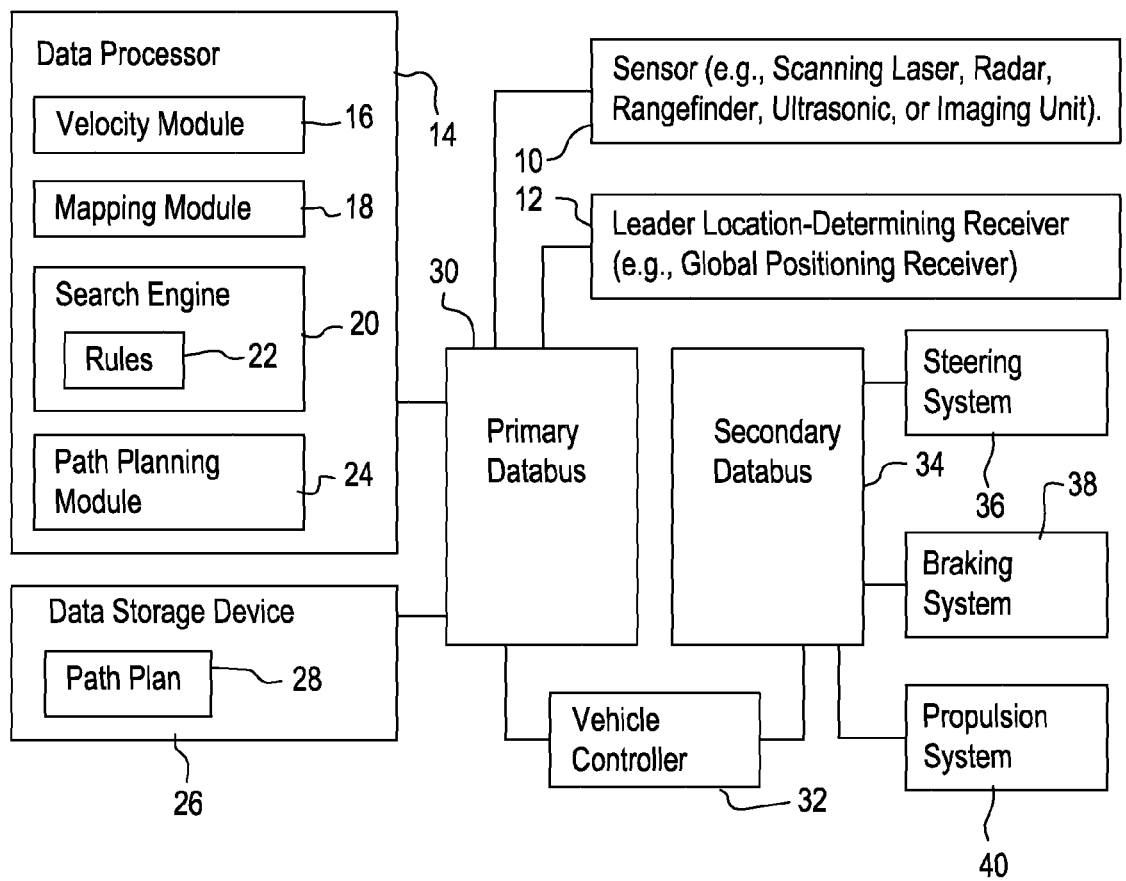
FIG. 1 is a block diagram of one embodiment of a system of obstacle avoidance of a vehicle.

FIG. 1 illustrates one possible embodiment for the obstacle avoidance system 11. An obstacle is a stationary object, a mobile object, or another object that occupies a spatial location that is directly or indirectly between a vehicle at an origination position (e.g., origination coordinates) and a destination position (e.g., destination coordinates). The obstacle avoidance system 11 comprises a sensor 10, a location-determining receiver 12, a data processor 14 and a data storage device 26 coupled to a primary databus 30. The primary data bus 30 is coupled to a vehicle controller 32.

A secondary databus 34 is coupled to the vehicle controller 32. Although the steering system 36, a braking system 38, and a propulsion system 40 are coupled to the secondary databus 34 as shown in FIG. 1, in another embodiment the steering system 36, the braking system 38, and the propulsion system 40 may be coupled to the vehicle controller 32 via one or more transmission lines.

The data processor 14 is capable of communicating with any of the following devices: the sensor 10, the location-determining receiver 12, the data storage device 26 and the vehicle controller 32. The data processor 14 comprises a velocity module 16, a mapping module 18 (or path filtering module), a search engine 20, and a path planning module 24. The search engine 20 may further comprise rules 22. The data storage device 26 comprises may store any of the following data: a path plan 28, path plan data, vehicle trajectory data, last curved path of a vehicle, obstacle position (e.g., obstacle coordinates), vehicle position (e.g., coordinates), vehicle translational velocity, vehicle rotational velocity.

In one embodiment, the sensor 10 comprises one or more of the following devices: a scanning laser, radar, laser range finder, range finder, ultrasonic obstacle detector, a stereo vision system, a monocular vision system, a camera, and an imaging unit. The sensor 10 may scan an environment around the vehicle to determine a location of one or more obstacles with respect to the vehicle or sensor 10. For example, the sensor 10 may provide an obstacle map or an occupancy grid which obstacles are marked as present in cells or grid locations. Alternatively, the sensor 10 may provide range data in the format of angular bearing and distance to the vehicle or sensor 10. In one embodiment, the sensor 10 may provide angular velocity data or angular rotation data versus time data for the sensor 10, or the vehicle.

The location-determining receiver 12 may comprise a Global Positioning System receiver, a Global Positioning System receiver with differential correction, or another receiver for determining the location of a vehicle with respect to satellite or terrestrial beacons that transmit electromagnetic signals. The location-determining receiver 12 may provide one or more of the following: translational velocity data for the vehicle, vehicular position data (e.g., coordinates), and vehicular position data versus time data.

In one embodiment, the data processor 14 comprises at least one or more of following items: a velocity module 16, a mapping module 18 (or path filtering module), a search engine 20, path planning module 24, and a data storage device 26. The sensor 10 and the location-determining receiver 12 may provide sensor data input and location data input to the data processor 14, the vehicle controller 32, or both. The data storage device 26 may provide stored data or path plan data to the data processor 14, the vehicle controller 32, or both.

The vehicle controller 32 may communicate with one or more of the following systems via the secondary databus 34: the steering system 36, the braking system 38, and the propulsion system 40.

The steering system 36 comprises a hydraulic steering system, an electro-hydraulic steering system, an electro-mechanical steering system, an electromechanical actuator, an electrical steering system, a drive-by-wire steering system or another steering system with an electrical or electronic control interface for communicating over the secondary databus 34 or otherwise communicating with the vehicle controller 32. In one embodiment, the electronic control interface may comprise a sensor for detecting a position of a hydraulic cylinder of the steering system 36 and an actuator for controlling the position of one or more wheels (e.g., ground engaging wheels) or a hydraulic cylinder in response to commands from the vehicle controller 32. Although the steering system 36 uses digital messages (e.g., logic level signals) to control steering as shown, in an alternate embodiment the steering system 36 may use analog signals, particularly if the steering system 36 is configured to directly communicate with the vehicle controller 32 via a transmission line instead of the secondary databus 34.

The braking system 38 comprises a hydraulic braking system, an electro-hydraulic braking system, an electro-mechanical braking system, an electromechanical actuator, an electrical braking system, a brake-by-wire braking system, or another braking system with an electrical or electronic control interface for communicating over the secondary databus 34 or otherwise communicating with the vehicle controller 32. In one embodiment, the electronic control interface may comprise a sensor for detecting a position of a hydraulic cylinder of the braking system 38 and an actuator for controlling or modulating the position of the braking system 38 in response to commands from the vehicle controller 32. Although the braking system 38 uses digital messages (e.g., logic level signals) to control braking as shown, in an alternate embodiment the braking system 38 may use analog signals, particularly if the braking system 38 is configured to directly communicate with the vehicle controller 32 via a transmission line instead of the secondary databus 34.

In one embodiment, the propulsion system 40 comprises the combination of an engine controller and an internal combustion engine. The engine controller may control the throttle setting, carburetor, fuel injection system, fuel-metering system or air-metering system, or other fuel delivery system for the internal combustion engine, for example.

In another embodiment, the propulsion system 40 comprises an electric motor, a drive motor, an alternating current motor, an induction motor, a permanent magnet motor, a direct current motor, or another suitable motor for propelling a vehicle. Further, the propulsion system 40 may comprise a motor controller (e.g., an inverter, chopper, wave generator, a multiphase controller, variable frequency oscillator, variable current supply, or variable voltage supply) for controlling at least one of the velocity, torque, and direction of rotation of the motor shaft of the electric motor. In yet another embodiment, the propulsion system 40 comprises a hybrid drive system, a parallel hybrid system, or a series hybrid system, in which at least one of an electric motor and an internal combustion engine can propel the vehicle. For example, in a parallel hybrid system, the electric motor, the internal combustion engine or both may apply power to one or more wheels of the vehicle. For a series hybrid system, the electric motor typically provides mechanical energy to one or more wheels of the vehicle, whereas the internal combustion engine provides mechanical, rotational energy to an alternator or generator for generating electrical energy for the electric motor, or an electrical storage device associated with the electric motor.

In accordance with one embodiment, the sensor 10 collects sensor 10 data on a relative position of one or more obstacles with respect to a vehicle. A velocity module 16 estimates observed translational velocity, the observed rotational velocity of a vehicle, or both. The translational velocity is a linear velocity of the vehicle, which may be expressed as the first derivative of vehicular position versus time. The Rotational velocity is a change in angular position of the vehicle versus time, which may be expressed as the first derivative of the angular position versus time.

The location-determining receiver 12 may output the translational velocity or linear velocity of the vehicle. For rotational velocity, the velocity module 16 may use the observed translational velocity (or position versus time measurements from the location-determining receiver 12) combined with detected rotational movement of the sensor 10 to estimate the observed rotational velocity of the vehicle. The rotational movement of the sensor 10 may be detected with reference to one or more fixed reference points or stationary objects in the vehicular environment, for instance.

A mapping module 18 (or path filtering module) or data processor 14 determines possible curved paths for the vehicle associated with candidate translational velocities and candidate rotational velocities. The mapping module 18 (or path filtering module) is arranged to identify admissible curved paths for which the vehicle is able to stop prior to reaching the obstacle in accordance with (e.g., where the vehicle starts with) the observed translational velocity and the observed rotational velocity. A data processor 14 determines a respective objective function for the candidate translational velocities and candidate rotational velocities associated with the admissible curved paths, where the objective function includes a weighted comparison term associated with the last curved path of the vehicle. A search engine 20 or data processor 14 selects preferential velocities, among the candidate translational velocities and candidate rotational velocities, with a superior value for its corresponding objective function. A candidate curvature that is similar in shape or attributes to the last curvature of the vehicle may be assigned a higher value that increases the value of the candidate curvature's contribution to the objective function. Accordingly, the objective function is somewhat biased toward selection of candidate curvatures or candidate path plans consistent with the last curvature or historic path plans.

A path planning module 24 or data processor 14 determines the vehicular speed and trajectory for a path plan 28 that avoids the obstacle consistent with the selected preferential velocities.

Figure 2:
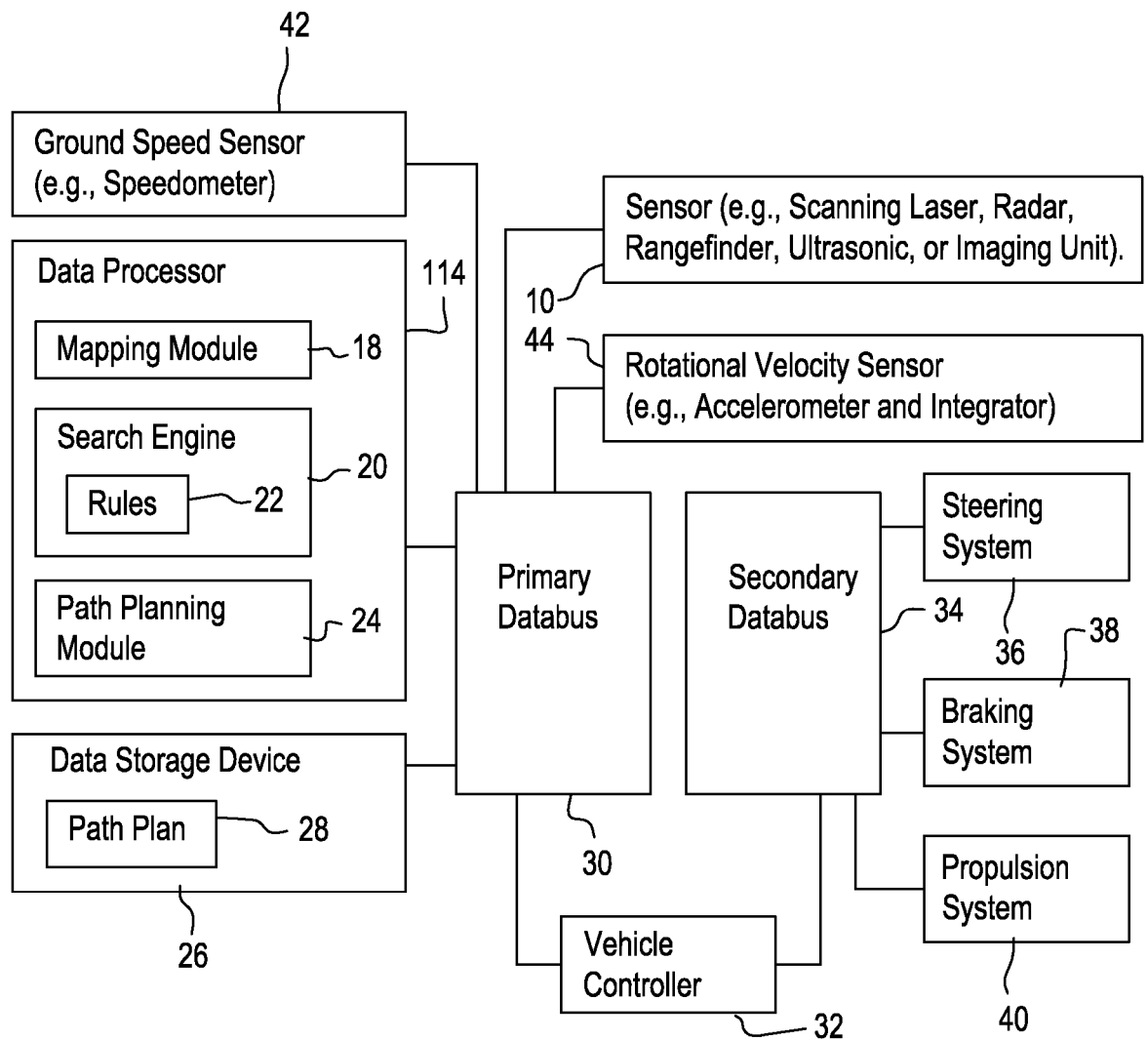
FIG. 2 is a block diagram of another embodiment of a system of obstacle avoidance of a vehicle.

The obstacle avoidance system of FIG. 1 is similar to the obstacle avoidance system of FIG. 2, except the obstacle avoidance system of FIG. 2 replaces the location-determining receiver 12 with a ground speed sensor 42, adds a rotational velocity sensor 44, and features data processor 114. Data processor 114 is similar to data processor 14, except data processor 114 omits the velocity module 16.

In one embodiment, the ground speed sensor 42 comprises a speedometer or radar-based sensor. The rotational velocity sensor 44 comprises the combination of an accelerometer and an integrator. The rotational velocity sensor 44 or sensor 10 may provide an observed rotational velocity for the data processor 14, or any module thereof.

Figure 3:
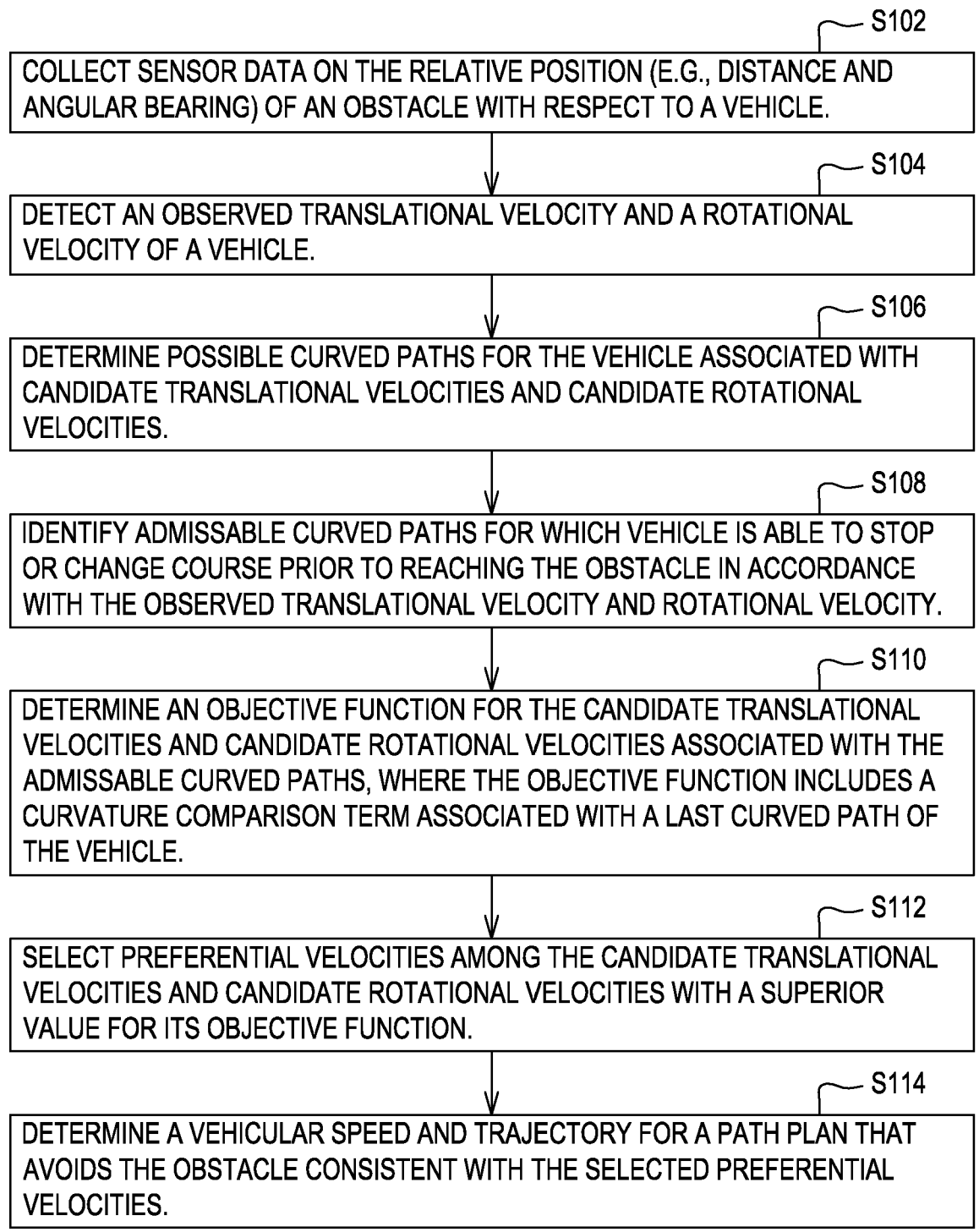
FIG. 3 is a flow chart of one embodiment of a method for obstacle avoidance of a vehicle.

FIG. 3 discloses an illustrative method for avoiding an obstacle, which may be applied to the system of FIG. 1, FIG. 2, or any other system that falls within the scope of the disclosure or attached claims. In order to safeguard a vehicle from objects in the environment, the vehicle must be able to perceive or sense the local environment, understand what is being perceived, make a rationale decision (or plan) about future courses of action to deal with one or more objects, then act on this decision. The method of FIG. 3 generally relates to re-planning trajectories in order to safely avoid an unexpected obstacle, for example. The method of FIG. 3 starts in step S102.

In step S102, a sensor 10 collects sensor data on respective relative positions of one or more obstacles with respect to a vehicle or a sensor 10 at a time interval or at a regular time interval. Each relative position may refer to a distance an angular bearing of the obstacle with respect to the vehicle or the sensor 10. Alternatively, the sensor 10 collects sensor data or relative position data to populate occupied cells of an occupancy grid with one or more obstacles.

An obstacle is any object that lies within a certain defined area or defined volume with respect to the vehicle. For example, an obstacle may be defined as a stationary or mobile object within a zone in front of the direction of travel of the vehicle or a radial zone about the entire vehicle. An obstacle may also represent any object that intersects with a planned path or planned path segment of the vehicle.

In step S104, a velocity module 16 detects an observed translational velocity and an observed rotational velocity of a vehicle. The translational velocity is a linear velocity of the vehicle, which may be expressed as the first derivative of vehicular position versus time. The translational velocity may be associated with the heading or direction of travel of the vehicle relative to a reference heading (e.g., magnetic North). The rotational velocity is a change in angular position of the vehicle versus time, which may be expressed as the first derivative of the angular position versus time.

Step S104 may be carried out in accordance with various procedures that may be executed together or separately. Under a first procedure, the location-determining receiver 12 may output the translational velocity or the linear velocity of the vehicle. Under a second procedure, the location-determining receiver 12 may output the translational velocity of the vehicle and an associated heading or angular bearing of the vehicle. Under a third procedure, a speedometer, a motion detector, a radar-based speed sensor, a laser-based speed sensor, the combination of an odometer and a timer, or the combination of an accelerometer and an integrator may provide a translational velocity. Under a fourth procedure, any of the foregoing devices of the third procedure are supplemented by a bearing instrument (e.g., magnetic compass) that estimates a heading of the vehicle. Under a fifth procedure, the location-determining receiver 12 outputs the translational velocity and the velocity module 16 estimates the rotational velocity based on detected rotational movement of the sensor 10, with due consideration of translational velocity.

In step S106, a mapping module 18 (or path filtering module) or data processor (14 or 114) determines possible curved paths for the vehicle associated with candidate translational velocities and candidate rotational velocities. The possible curved paths may be based on the following factors: a current position of the vehicle, an estimated position of the vehicle, at least one obstacle position, a target position of the vehicle, a minimum turning radius of the vehicle, a current bearing of the vehicle, a maximum deceleration of the vehicle, observed translational velocity (e.g., current translational velocity) of the vehicle, and observed rotational velocity (e.g., current rotational velocity) of the vehicle. In one embodiment, each possible curved path may be defined as an arc in accordance with an elliptical path, a semi-circular path, a series of interconnected line segments, or another model of the possible curved path.

In step S108, the mapping module 18 (or path filtering module) or the data processor (14 or 114) is arranged to identify admissible curved paths for which the vehicle is able to stop or change course prior to reaching the obstacle (or multiple obstacles under consideration) in accordance with the observed translational velocity and the observed rotational velocity. Step S108 may be carried out in accordance with various techniques that may be applied alternately, or cumulatively. Under a first technique, the mapping module 18 (or path filtering module) or the data processor (14 or 114) identifies admissible curved paths as those associated with rotational and translational velocity pairs for which the vehicle is able to stop before it reaches the closest obstacle on the corresponding curvature of the curved path. Under a second technique, the mapping module 18 (or path filtering module) or the data processor (14 or 114) searches rotational and translational velocity pairs, even if the vehicle is potentially unable to stop before it reaches the closest obstacle along the corresponding curvature. This second technique may be used for several reasons. First, because of momentum of the vehicle and data processing lag, the vehicle controller 32 can not realistically switch to any new velocity pair instantaneously. Hence, the actual path of the vehicle may differ from the theoretical path of the vehicle because of the lag in switching between curved paths. Second, the data processor (14 or 114) may have an independent or supplemental routine or arbiter that calculates the maximum safe speed for the vehicle to travel to prevent a collision between the vehicle and the obstacle from occurring within a certain time window. Third, the calculation for whether or not it is able to stop relies on the fact that the vehicle instantaneously changed to the velocity pair, traveled along the arc in the algorithm execution period, and then went straight until it hit the obstacle without any course alteration in any subsequent evaluation time interval prior to the anticipated collision. However, in the subsequent evaluation time interval or prior thereto, the data processor (14 or 114) or the vehicle controller 32 may change the trajectory by some predetermined offset to avoid the obstacle.

In step S110, a data processor (14 or 114) determines a respective objective function for the candidate translational velocities and candidate rotational velocities associated with the admissible curved paths, where the objective function includes a curvature comparison term (e.g., curvature comparison function) associated with the last curved path of the vehicle.

The curvature comparison term facilitates comparison of the proposed candidate curved path with the last planned curvature or last curved path. In one embodiment, the curvature comparison term is weighted to adjust its relative contribution to the objective function. In another embodiment, a high value of the curvature comparison term is awarded to a proposed candidate curved path that has the same sign, general lateral heading, or directional orientation as the last curved path of the vehicle if an alignment of a current vehicular heading is within a maximum angular range with respect to the last vehicular heading of the last curved path.

In one illustrative example, the curvature comparison term is set forth as the last term, $\delta^*lastC(v,\omega)$, of the following objective function equation:

$$G(v,\omega)=\alpha^*heading(v,\omega)+\beta^*dist(v,\omega)+\gamma^*velocity(v,\omega)+\delta^*lastC(v,\omega),$$

where $G(v,\omega)$ is the objective function, $lastC(v,\omega)$ is the comparison function with the last curvature, $\alpha, \beta, \gamma$ are weights associated with alignment with the target heading, distance to the nearest obstacle and the velocity of travel, respectively; $heading(v,\omega)$ is a target heading function, $dist(v,\omega)$ is clearance function to provide adequate clearance between the vehicle and the obstacle; and $velocity(v,\omega)$ is velocity function; $v$ is translational velocity; and $\omega$ is the rotational velocity.

With respect to the above objective function, the weight a may be adjusted to include or support a buffer distance or buffer radius between the sides of the vehicle and an obstacle. The heading(v,ω) function measures the alignment of the robot with the target direction; the output may be normalized. The dist(v,ω) function represents the distance to the closest obstacle that intersects with the curvature; the output may be normalized. The velocity(v,ω) function is a projection of the velocity; output may be normalized. Although the foregoing objective function increases in value with increasing superiority or favorability of the objective function such that the preferential velocities are associated with a maximum value of the objective function, in other embodiments the objective function may decrease in value with increasing superiority or favorability such that the preferential values are associated with a minimum value of the objective function.

In an alternative embodiment, it is understood that the curvature comparison term may be used with other objective functions associated with other local or reactive path planning approaches (e.g., any dynamic window algorithm). For example, the following alternative objective function may be applied:

$$G(v,\omega)=\sigma(\alpha * heading(v,\omega)+\beta * dist(v,\omega)+\gamma * velocity(v,\omega))+\delta * lastC(v,\omega),$$

where G(v,ω) is the objective function, σ is the smoothing function, lastC(v,ω) is the comparison function with the last curvature, α, β, γ are weights associated with alignment with the target heading, distance to the nearest obstacle and the velocity of travel, respectively; heading(v,ω) is a target heading function, dist(v,ω) is clearance function to provide adequate clearance between the vehicle and the obstacle; velocity (v,ω) is velocity function; v is translational velocity; and ω is the rotational velocity.

The smoothing function provides a buffer distance between one or more obstacles and a side or sides of the vehicle. Although the foregoing objective function increases in value with increasing superiority or favorability of the objective function such that the preferential velocities are associated with a maximum value of the objective function, in other embodiments the objective function may decrease in value with increasing superiority or favorability such that the preferential values are associated with a minimum value of the objective function.

In step S112, a search engine 20 or data processor (14 or 114) selects preferential velocities, among the candidate translational velocities and candidate rotational velocities, with a superior value for its corresponding objective function. For example, the path planning module 24 or data processor (14 or 114) selects a preferential rotational and translational velocity pair associated with the superior (e.g., best or highest) value for the objective function. The velocity pair with the highest value for the objective function is chosen as the next planned trajectory. The trajectory will be an arc starting from the current position and heading of the robot and it will have a radius equal to v/w. The output of the objective function may be normalized. The objective function reduces or eliminates indecisiveness when an obstacle was directly in front of the robotic vehicle.

In step S112, the search space of the possible velocities is evaluated in an efficient manner. The search space of the vehicle may be embodied as two dimensional velocity space, that includes a translational velocity component and the rotational velocity component. For example, the translational velocity may be plotted on a vertical axis, whereas the horizontal velocity may be plotted on a horizontal axis. Within the two dimensional velocity space, a dynamic window (e.g., rectangular or circular window) around the current operating point of the vehicle is calculated based on the maximum accelerations of the vehicle and the repetition rate of the algorithm. The current operating point represents the observed translational velocity and the observed rotational velocity of the vehicle. The search space may be limited to the dynamic window to facilitate rapid collision avoidance responses and path re-planning to one or more obstacles within the dynamic window. In one embodiment, the space may be reduced according one or more of the following criteria:

(1) Consider only circular curvatures determined by pairs (v,w) of translational and rotational velocities. This results in a 2-dimensional velocity search space.

(2) Velocity pair must be admissible. A pair is admissible if the robot is able to stop before it reaches the closest obstacle on the corresponding curvature, unless an exception or relaxation of this standard is applied as otherwise noted in this disclosure. Further any candidate velocity pair of candidate rotational velocity and candidate translational velocity which would yield a collision with an obstacle is generally considered inadmissible.

(3) Only those admissible pairs that lie within the dynamic window are considered. The dynamic window will restrict these velocities to those that can be reached within a short time interval given the limited accelerations of the robot.

In step S114, a path planning module 24 or data processor (14 or 114) determines the vehicular speed and trajectory for a path plan 28 that avoids the obstacle consistent with the selected preferential velocities. In one example for carrying out step S114, the intended speed and trajectory is associated with the preferential translational and rotational velocity pair. In another example for carrying out step S114, the intended speed and trajectory is associated with changing the trajectory of the vehicle by a predetermined angular heading offset to avoid the obstacle during a subsequent time interval prior to an anticipated collision.

The foregoing method is well suited for the vehicle to safeguard itself from unexpected obstacles in unstructured environments is critical for robust operation in most applications. The foregoing method may be used without global information on the environment in which the vehicle is operating to avoid obstacles. Instead, the foregoing method may only rely on, use or collect a small fraction of the world model to generate control output to rapidly avoid an obstacle. The above method is superior to other approaches when the vehicle is situated in denser obstacle environments and/or it is expected to perform at higher speeds because it considers the dynamic environment associated with translational and rotational velocity.

For example, the above method may be used in a forestry environment or on wooded land, where the vehicle is a forestry harvesting machine and obstacles comprise tree trunks, stumps, and other objects on the wooded land. A forestry harvesting machine comprises a vehicle with wheels or tracks that has a cutter, a shear, a saw (e.g., a chain saw or a circular saw) for sawing or cutting trees or wood. A forestry harvesting machine may comprise a feller buncher, which comprises a tree-grabbing device associated with a cutter, shear, or saw for cutting a tree off at its base and placing the cut tree on a stack suitable for transport by a loader or forwarder, or for further processing (e.g., cutting to length, removing limbs, or chipping).

Having described the preferred embodiment, it will become apparent that various modifications can be made without departing from the scope of the invention as defined in the accompanying claims.

The following is claimed:

1. A method for avoiding an obstacle, the method comprising:
   collecting sensor data on a relative position of an obstacle with respect to a vehicle;
   detecting an observed translational velocity and an observed rotational velocity of a vehicle;
   determining possible curved paths for the vehicle associated with candidate translational velocities and candidate rotational velocities;
   identifying admissible curved paths for which the vehicle is able to stop prior to reaching the obstacle in accordance with the observed translational velocity and the observed rotational velocity;
   determining a respective objective function for the candidate translational velocities and candidate rotational velocities associated with the admissible curved paths, where the objective function is determined in accordance with the following equation:

$$G(v,\omega)=\alpha*heading(v,\omega)+\beta*dist(v,\omega)+\gamma*velocity(v,\omega)+\delta*lastC(v,\omega),$$

where $G(v,\omega)$ is the objective function; $\alpha$, $\beta$, $\gamma$ are weights associated with alignment with the target heading, distance to the nearest obstacle and the velocity of travel, respectively; heading$(v,\omega)$ is a target heading function; dist$(v,\omega)$ is clearance function to provide adequate clearance between the vehicle and the obstacle; and velocity$(v,\omega)$ is velocity function; and lastC$(v,\omega)$ is the curvature comparison term or function;
   selecting preferential velocities, among the candidate translational velocities and candidate rotational velocities, with a superior value for its corresponding objective function; and
   determining a vehicular speed and trajectory for a path plan that avoids the obstacle consistent with the selected preferential velocities.

2. The method according to claim 1 wherein the curvature comparison term facilitates comparison of a proposed candidate curved path with the last curved path.

3. The method according to claim 2 wherein the curvature comparison term is weighted to adjust its relative contribution to the objective function.

4. The method according to claim 1 wherein a high value of the curvature comparison term is awarded to a proposed candidate curved path that has the same sign or general lateral heading as the last curved path of the vehicle if an alignment of a current vehicular heading is within a maximum angular range with respect to the last vehicular heading of the last curved path.

5. The method according to claim 1 wherein the vehicle comprises a forestry harvesting machine for harvesting wood on a wooded lot and obstacles comprise tree trunks, stumps, and other objects on the wooded land.

6. The method according to claim 1 further comprising:
   identifying admissible curved paths as those associated with rotational and translational velocity pairs for which the vehicle is able to stop before it reaches a closest obstacle on a corresponding curvature of the curved path.

7. The method according to claim 1 further comprising:
   calculating a maximum safe speed for the vehicle to travel to prevent a collision between the vehicle and the obstacle from occurring within a certain time window.

8. The method according to claim 1 further comprising changing the trajectory of the vehicle by a predetermined angular heading offset to avoid the obstacle during a subsequent time interval prior to an anticipated collision.

9. A method for avoiding an obstacle, the method comprising:
   collecting sensor data on a relative position of an obstacle with respect to a vehicle;
   detecting an observed translational velocity and an observed rotational velocity of a vehicle;
   determining possible curved paths for the vehicle associated with candidate translational velocities and candidate rotational velocities;
   identifying admissible curved paths for which the vehicle is able to stop prior to reaching the obstacle in accordance with the observed translational velocity and the observed rotational velocity;
   determining a respective objective function for the candidate translational velocities and candidate rotational velocities associated with the admissible curved paths, wherein the objective function is determined in accordance with the following equation:

$$G(v,\omega)=\sigma(\alpha*heading(v,\omega)+\beta*dist(v,\omega)+\gamma*velocity(v,\omega))+\delta*lastC(v,\omega),$$

where $G(v,\omega)$ is the objective function, $\sigma$ is a smoothing function; $\alpha$, $\beta$, $\gamma$ are weights associated with alignment with the target heading, distance to the nearest obstacle and the velocity of travel, respectively; heading$(v,\omega)$ is a target heading function; dist$(v,\omega)$ is clearance function to provide adequate clearance between the vehicle and the obstacle; velocity$(v,\omega)$ is velocity function; and lastC$(v,\omega)$ the curvature comparison term or function;
   selecting preferential velocities, among the candidate translational velocities and candidate rotational velocities, with a superior value for its corresponding objective function; and
   determining a vehicular speed and trajectory for a path plan that avoids the obstacle consistent with the selected preferential velocities.

10. A system for avoiding an obstacle, the system comprising:
    a sensor for collecting sensor data on a relative position of an obstacle with respect to a vehicle;
    a velocity module for detecting an observed translational velocity and an observed rotational velocity of a vehicle;
    a mapping module for determining possible curved paths for the vehicle associated with candidate translational velocities and candidate rotational velocities, the mapping module arranged to identify admissible curved paths for which the vehicle is able to stop prior to reaching the obstacle in accordance with the observed translational velocity and the observed rotational velocity;
    a data processor for determining a respective objective function for the candidate translational velocities and candidate rotational velocities associated with the admissible curved paths, where the objective function is determined in accordance with the following equation:

$$G(v,\omega)=\alpha*heading(v,\omega)+\beta*dist(v,\omega)+\gamma*velocity(v,\omega)+\delta*lastC(v,\omega),$$

where $G(v,\omega)$ is the objective function; $\alpha$, $\beta$, $\gamma$ are weights associated with alignment with the target heading, distance to the nearest obstacle and the velocity of travel, respectively; heading$(v,\omega)$ is a target heading function; dist$(v,\omega)$ is clearance function to provide adequate clearance between the vehicle and the obstacle; and velocity$(v,\omega)$ is velocity function; and lastC$(v,\omega)$ is the curvature comparison term or function;

a search engine for selecting preferential velocities, among the candidate translational velocities and candidate rotational velocities, with a superior value for its corresponding objective function; and a path planning module for determining a vehicular speed and trajectory for a path plan that avoids the obstacle consistent with the selected preferential velocities.

11. The system according to claim 10 wherein the curvature comparison term facilitates comparison of a proposed candidate curved path with the last curved path.

12. The system according to claim 11 wherein the curvature comparison term is weighted to adjust its relative contribution to the objective function.

13. The system according to claim 10 wherein a high value of the curvature comparison term is awarded to a proposed candidate curved path that has the same sign or general lateral heading as the last curved path of the vehicle if an alignment of a current vehicular heading is within a maximum angular range with respect to the last vehicular heading of the last curved path.

14. The system according to claim 10 wherein the vehicle comprises a forestry harvesting machine for harvesting wood on a wooded lot and obstacles comprise tree trunks, stumps, and other objects on the wooded land.

15. The system according to claim 10 further comprising:
the mapping module arranged to identify admissible curved paths as those associated with rotational and translational velocity pairs for which the vehicle is able to stop before it reaches a closest obstacle on a corresponding curvature of the curved path.

16. The system according to claim 10 further comprising:
the data processor arranged for calculating a maximum safe speed for the vehicle to travel to prevent a collision between the vehicle and the obstacle from occurring within a certain time window.

17. The system according to claim 10 further comprising:
the path planning module adapted to change the trajectory of the vehicle by a predetermined angular heading offset to avoid the obstacle during a subsequent time interval prior to an anticipated collision.

18. A system for avoiding an obstacle the system comprising:
a sensor for collecting sensor data on a relative position of an obstacle with respect to a vehicle;

a velocity module for detecting an observed translational velocity and an observed rotational velocity of a vehicle;

a mapping module for determining possible curved paths for the vehicle associated with candidate translational velocities and candidate rotational velocities, the mapping module arranged to identify admissible curved paths for which the vehicle is able to stop prior to reaching the obstacle in accordance with the observed translational velocity and the observed rotational velocity;

a data processor for determining a respective objective function for the candidate translational velocities and candidate rotational velocities associated with the admissible curved paths wherein the objective function is determined in accordance with the following equation:

$$G(v,\omega)=\sigma(\alpha*\text{heading}(v,\omega)+\beta*\text{dist}(v,\omega)+\gamma*\text{velocity}(v,\omega))+\delta*\text{last}C(v,\omega),$$

where $G(v,\omega)$ is the objective function, $\sigma$ is a smoothing function; $\alpha, \beta, \gamma$ are weights associated with alignment with the target heading, distance to the nearest obstacle and the velocity of travel, respectively; heading$(v,\omega)$ is a target heading function; dist$(v,\omega)$ is clearance function to provide adequate clearance between the vehicle and the obstacle; velocity$(v,\omega)$ is velocity function; and last$C(v,\omega)$ the curvature comparison term or function;

a search engine for selecting preferential velocities, among the candidate translational velocities and candidate rotational velocities, with a superior value for its corresponding objective function; and a path planning module for determining a vehicular speed and trajectory for a path plan that avoids the obstacle consistent with the selected preferential velocities.

* * * * *